US009110718B2

(12) United States Patent  
Moir et al.

(10) Patent No.: US 9,110,718 B2  
(45) Date of Patent: Aug. 18, 2015

(54) SUPPORTING TARGETED STORES IN A SHARED-MEMORY MULTIPROCESSOR SYSTEM

(71) Applicant: Oracle International Corporation, Redwood Shores, CA (US)

(72) Inventors: Mark S. Moir, Wellington (NZ); David Dice, Foxboro, MA (US); Paul N. Loewenstein, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 119 days.

(21) Appl. No.: 13/625,700

(22) Filed: Sep. 24, 2012

(65) Prior Publication Data

US 2014/0089591 A1    Mar. 27, 2014

(51) Int. Cl.
*G06F 9/50*     (2006.01)
*G06F 12/08*    (2006.01)

(52) U.S. Cl.
CPC ............... *G06F 9/50* (2013.01); *G06F 9/5066* (2013.01); *G06F 12/0888* (2013.01)

(58) Field of Classification Search
CPC .......................... G06F 12/0888; G06F 9/5066
USPC ........................... 711/118, 137, 147; 712/207
See application file for complete search history.

(56) References Cited

U.S. PATENT DOCUMENTS 7,877,559 B2    1/2011 Lauterbach
2008/0229009 A1* 9/2008 Gaither et al. ................ 711/113

OTHER PUBLICATIONS

Palsetia, D., OS:System Calls, Published Jul. 27, 2010, retrieved from webarchive (http://web.archive.org/web/20100727025139/https://www.seas.upenn.edu/~cit595/cit595s10/lectures/systemcalls.pdf) on Apr. 2, 2014, 6 pages.*
"MOESI protocol", http://wikipedia.org/wiki/MOESI_protocol.
Lenoski, Daniel et al., "The Stanford Dash Multiprocessor", Mar. 1992, IEEE.

(Continued)

*Primary Examiner* — Aimee Li
*Assistant Examiner* — Gary W Cygiel
(74) *Attorney, Agent, or Firm* — Park, Vaughan, Fleming & Dowler LLP

(57) ABSTRACT

The present embodiments provide a system for supporting targeted stores in a shared-memory multiprocessor. A targeted store enables a first processor to push a cache line to be stored in a cache memory of a second processor in the shared-memory multiprocessor. This eliminates the need for multiple cache-coherence operations to transfer the cache line from the first processor to the second processor. The system includes an interface, such as an application programming interface (API), and a system call interface or an instruction-set architecture (ISA) that provides access to a number of mechanisms for supporting targeted stores. These mechanisms include a thread-location mechanism that determines a location near where a thread is executing in the shared-memory multiprocessor, and a targeted-store mechanism that targets a store to a location (e.g., cache memory) in the shared-memory multiprocessor.

20 Claims, 4 Drawing Sheets

(56) References Cited

OTHER PUBLICATIONS

Calciu, Irina et al., "Using fast shared memory synchronization for implementing concurrent data structures and other synchronization algorithms in large shared memory multiprocessors", Mar. 2012.

Calciu, Irina et al., "Using fast shared memory synchronization for implementing concurrent data structures and other synchronization algorithms in large shared memory multiprocessors", Jun. 2011.

* cited by examiner

SUPPORTING TARGETED STORES IN A SHARED-MEMORY MULTIPROCESSOR SYSTEM

BACKGROUND

1. Field

The disclosed embodiments relate to shared-memory multiprocessor systems. More specifically, the disclosed embodiments relate to an interface that supports targeted-store instructions, which are store instructions that are directed to a specific location (e.g., cache) in a shared-memory multiprocessor system.

2. Related Art

Shared-memory multiprocessor systems are continuing to grow in size, with increases both in the number of cores per chip, and the number of chips in a system. Moreover, there are differences in the number and size of caches, how they are shared (or not), and latencies between various levels of cache within and between chips, and to local and remote memory. Despite these differences, as systems grow, the latency of accessing remote elements (e.g., cache or memory) inherently grows relative to the latency of accessing local elements. That is, systems are increasingly NUMA (Non-Uniform Memory Access), and the NUMA constants (ratios of latencies to access remote and local elements) are growing.

Significant challenges for programmers accompany these changes. Software that has performed acceptably on smaller systems can suffer severe performance degradation when scaled to larger systems, especially due to NUMA effects.

Consider, for example, a hypothetical application running on a single-socket, multi-core system. Suppose the working set of the application is such that it fits comfortably in an on-chip cache (say L2), so that it exhibits good cache locality and performs well. In particular, when one thread accesses a memory location that has recently been modified by another thread, the location is likely to be in the on-chip L2 cache, in which case the access hits in the cache and no off-chip communication is required to satisfy the memory request. Otherwise, the location is stored in a memory that is physically close to the (single) processor chip.

Consider now a larger system with multiple processor sockets. Memory that is located physically close to one processor is necessarily further from others. Similarly, the caches of other processors are physically further away than a processor's own caches. Broadly, systems meeting this description are referred to as NUMA (Non-Uniform Memory Architecture). If the same application is configured now to run on such a system, even though its working set may still fit comfortably in cache, we now have threads running on different chips, and therefore inter-chip communication is required to keep the caches on the multiple chips coherent. In this case, when one thread accesses a memory location that has recently been modified by another, it is likely that the other thread is on a different chip. In this case, if the location is still in a cache near the thread that recently modified it, then it needs to be invalidated or downgraded in that cache, and brought into the cache of the thread performing the subsequent access. Alternatively, the location may no longer be cached; it may be stored at its home memory node, which is likely to be memory other than the memory located physically close to the thread performing the subsequent access.

The first problem in this scenario is obvious: the latency to access a memory location can increase significantly as system sizes grow. Perhaps less obviously, the bandwidth available for coherence and data communication is not growing at the same rate that the number of cores in systems is growing. Therefore, the problem may be further exacerbated when the coherence and memory traffic produced by an application or set of applications approach the bandwidth limitations of the system.

Therefore, techniques for reducing the amount of remote communication required by applications are needed, as well as techniques for reducing the cost—in terms of latency, bandwidth, or both.

SUMMARY

The present embodiments provide a system for supporting targeted stores to reduce the amount of remote communication in a shared-memory multiprocessor. Targeted-store instructions are like ordinary store instructions, except that they provide a destination identifier to express an expectation about where the stored value will soon be loaded, thus allowing an implementation to optimize performance by proactively sending the data to that location, rather than waiting for the data to be requested by the thread that reads it next.

The identifier provided by a targeted-store instruction may be associated with a cache "near" the thread that will read the stored value. In this case, the goal of a targeted store is to "push" the stored data to that cache, thereby eliminating the need for the receiver to request the stored-to cache line, and the sender to respond. This can reduce both latency and the amount of coherence traffic generated by such synchronization in existing systems. (Note that structures other than a cache can be used for this purpose. For example, other resources, such as dedicated buffers, can be used to facilitate targeted stores instead of using a cache.)

In some embodiments, targeted stores have the same semantics as ordinary stores, and target identifiers are merely performance hints; in others, targeted stores provide a weaker memory consistency model (without affecting the memory model for locations not accessed using targeted stores), which can enable some optimized implementations.

The system for supporting targeted stores includes an interface, (such as an application programming interface (API), a system call interface or an instruction-set architecture (ISA)) that provides access to a number of mechanisms for supporting targeted stores. These mechanisms include a thread-location mechanism that determines a location near where a thread is executing in the shared-memory multiprocessor, and a targeted-store mechanism that targets a store to a location (e.g., cache memory) in the shared-memory multiprocessor.

In some embodiments, the determined location in the shared-memory multiprocessor comprises a cache memory or a set of cache memories in the shared-memory multiprocessor.

In some embodiments, the interface facilitates executing instructions that comprise an instruction-set architecture for the shared-memory multiprocessor.

In some embodiments, the interface implements a system call interface for an operating system in the shared-memory multiprocessor.

In some embodiments, the interface comprises an application programming interface (API) including functions or methods that provide access to the targeted-store mechanism and the thread-location mechanism.

In some embodiments, the targeted-store mechanism either directly implements or indirectly calls a special-purpose targeted-store instruction in an instruction-set architecture for the shared-memory multiprocessor.

In some embodiments, the thread-location mechanism retrieves thread-state information maintained by the system software, wherein the thread-state information may indicate a location near where the thread is executing within the multiprocessor system.

In some embodiments, the system software comprises either a hypervisor for the multiprocessor system, or an operating system for the multiprocessor system.

In some embodiments, the thread-location mechanism retrieves thread-location information from system hardware.

In some embodiments, the targeted-store mechanism and the thread-location mechanism access one or more data structures in the shared-memory multiprocessor.

DETAILED DESCRIPTION

Figure 1:
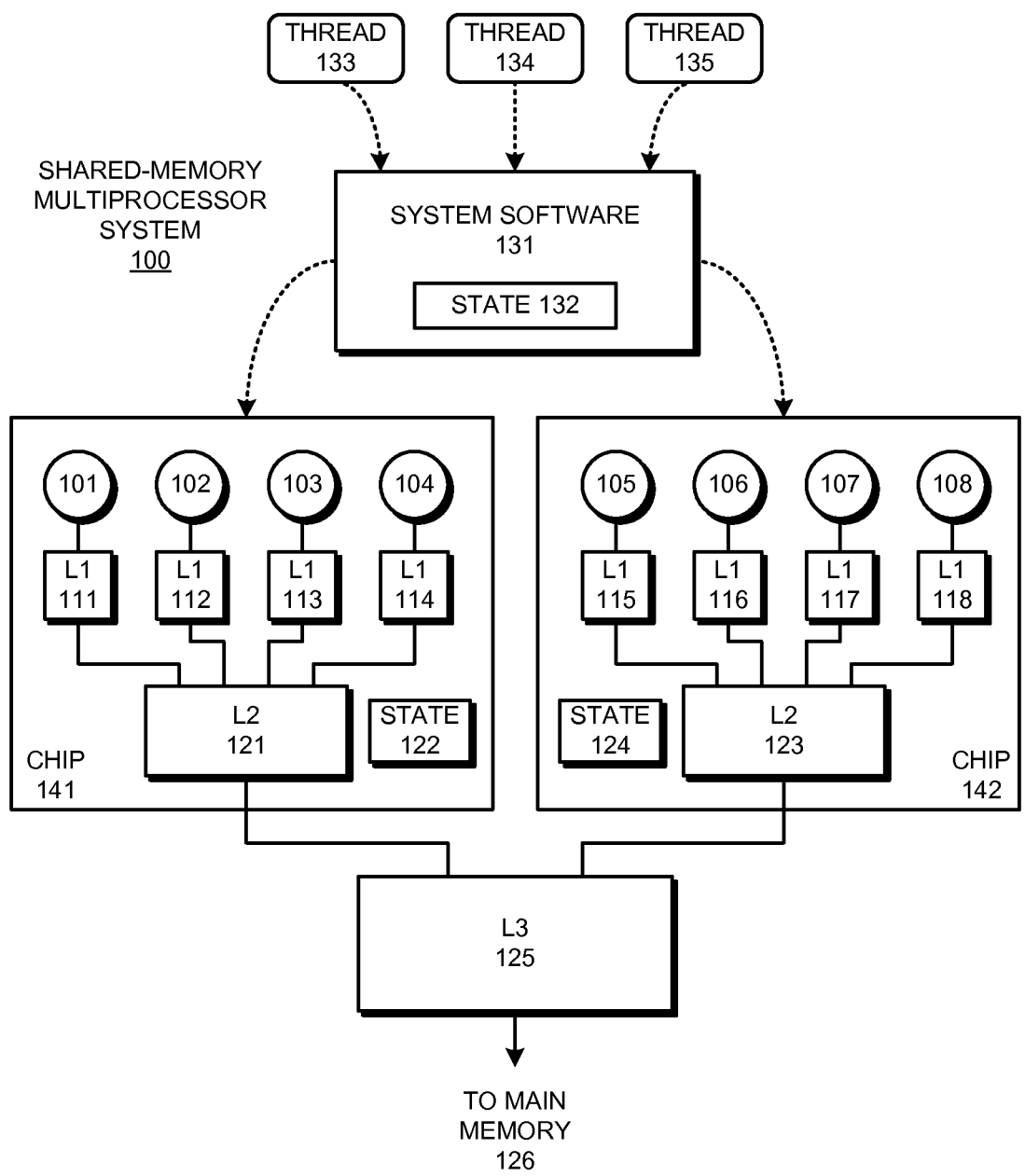
FIG. 1 illustrates a shared-memory multiprocessor system in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Motivation and Overview

Suppose a thread wishes to request that an operation be executed remotely on its behalf. Ideally, only two remote messages would be required: one for the request and one for the response. To achieve this, it is necessary to avoid the kinds of coherence patterns that commonly arise when using shared memory for synchronization. As motivation, consider the following pseudocode, in which the client posts a request and awaits the response, and the server awaits a request, performs it, and posts a response to the client. For convenience of exposition, we assume that all requests and responses are non-NULL, and that the locations pointed to by REQ and RSP are both NULL before the exchange illustrated below.

| Client | Server |
|---|---|
| r = <request,RSP><br>*REQ = r;<br><br>while(*RSP == NULL){ };<br>use(*RSP); | while (*REQ != NULL) { };<br>r = *REQ;<br>process(r.request);<br>*RSP= response; |

The details of what happens during this exchange depend on several factors, such as the system topology; whether cache coherence is snoop based, directory based, or some combination thereof; whether data and ownership are managed by separate messages and/or networks; etc. However, independent of these details, almost all existing systems will incur communication at least as much as the following example, which assumes a very simple model in which all coherence requests are broadcast to all caches.

In order to store to the location pointed to by REQ, a "read to own" RTO request is broadcast by the client, causing all other caches, including at least the server's cache, to relinquish any ownership and/or invalidate any copies of the cache line they may have.

Next, the server thread again requests the cache line containing the request in order to determine if a request has arrived (because it was invalidated by the client's request), again resulting in a coherence message—"read to share" (RTS) in this case—being broadcast to all caches. Having done so, it can then receive the data and begin processing the request.

After the request is processed, a similar set of events occur before the client receives the response to its request. The fundamental communication requirement for the server to receive a request from the client and send a response is two point-to-point messages. Note that the scenario described above involves twice as many coherence messages even in the best case; furthermore, these coherence messages are broadcast globally. Thus, there is a significant gap between what is fundamentally required and what actually happens in today's multiprocessors, in terms of both latency and communication bandwidth.

Some systems use directory-based cache coherence mechanisms in order to avoid the need to broadcast coherence messages to all caches in the system. Broadly, such systems maintain directories indicating where copies of data are (potentially) cached, allowing for cached copies to be invalidated without resorting to global broadcast.

While such approaches can be more scalable than those in which all coherence messages are globally broadcast, they also involve even more communication overhead than described above for simple broadcast-based systems. In particular, it is typically necessary to first communicate with the home node for a memory location in order to determine which caches may require invalidation messages; furthermore, the home node must typically be informed of any changes of ownership. Making matters worse, such systems typically require a processor to await acknowledgment of requested invalidations before proceeding, unlike broadcast-based systems in which it is usually sufficient to wait until the message is known to have been received by all other caches. Thus, the amount of communication required for the simple exchange described above is even worse in such systems, making the techniques we are proposing even more important.

We believe that the key reasons for a lot of the communication overhead involved in performing such a simple exchange on existing systems are:

In traditional cache coherence protocols, all communication is initiated by "pull" requests, so critical data does not start traveling to the place it is needed until a thread from that place requests it; either these requests are made frequently, which may cause excessive global communication, or they are made less frequently, which increases latency.

The need to support general shared-memory synchronization mechanisms; for example, if the hardware does not know whether there is other important data in the cache line with a synchronization variable, it must fetch the cache line before writing to it, which may involve invalidating other copies, etc.

The general approach we describe in this document is to identify some use patterns for shared-memory synchronization such that hardware can be optimized to support these patterns as efficiently as possible. To improve the chances of our ideas being adopted in practice, we wish to minimize the impact of any proposed solutions on the rest of the system. Furthermore, if the proposed hardware support improves the performance of code that can be run in existing systems, it will be possible to explore the ideas without needing special hardware support or simulation thereof.

The first technique we describe is motivated by the above observation that synchronization is typically supported by "pull" type mechanisms, which as described above, results in significant unnecessary overhead in terms of both latency and communication bandwidth. The idea is to extend existing instruction-set architectures (ISAs) to support the ability to specify a target cache to which a cache line that is about to be written should be proactively sent. Precise details of how to name a target cache, how to specify this and tie it to a specific store instruction are not important to exploring whether and how these ideas could be exploited by software.

Furthermore, to facilitate applications that use our techniques being ported to different platforms, we should avoid the application having to specify system-specific information, such as knowledge of the particular number and arrangement of caches, etc.

Therefore, we simply assume the following abstraction:

A thread can call a function localTarget( ), which returns a value that serves as an identifier for a place from which the thread is likely to be able to retrieve data quickly in the near future.

A thread can specify a target identifier for a given store instruction, meaning that after the value is written, the cache line containing it should be sent proactively to the cache or location specified by the target identifier.

The target location may be expressed via a variety of interfaces at different levels. For one example, it may be expressed using pragmas or attributes in a high-level language, and it may be expressed in machine code via address space identifiers, use of a designated or a specified register, etc. Our invention applies to all such variants and others.

In the pseudocode examples presented in this document, we indicate the target location for a store by including it in double square brackets after a pseudocode statement that entails a store instruction. For example, X=x[[t]];

means store value x to variable X and then push the cache line containing it to target t, where t is a value returned by a call to localTarget( ) by the target thread.

With such support, a server thread can periodically advertise its target, or perhaps the thread is bound to a core or to a set of cores such that the value returned by its call to localTarget( ) would never change, and thus its location is known and static. For simplicity, our examples assume that this is the case.

Our ideas about hardware support assume that requests and responses are aligned and (if necessary) padded, so that any remaining part of a cache line they occupy is not used for any other purpose (i.e., false sharing is avoided). This allows certain optimizations, such as not needing to fetch the current contents of a cache line before storing a new request into it. We do not clutter our pseudocode examples by explicitly conforming to these assumptions, but all can easily be modified to do so.

Consider a service thread is whose call to localTarget( ) returns a value ts_tgt. Then, a client thread might perform a request as follows:

req=<prepare request>;
*REQ=req[[ts_tgt]];

Similarly, in order to expedite delivery of a response, the client thread may specify a memory location where the response can be written by the server, and also specify a target for the server's store to this location. Thus, the above example becomes:

| Client | Server |
|---|---|
| r = <request,RSP,localTarget( )> | |
| *REQ = r [[srv_tgt]]; | while (*REQ != NULL) { }; |
| | r = *REQ; |
| | response = process(r.request); |
| while (*RSP == NULL) { } ; | *(r.rsp) = response [[r.target]]; |
| use(*RSP); | | where srv_tgt is the known target for the server thread (i.e., localTarget( ) returns srv_tgt for the server thread, and would never change because the server thread is assumed to be bound to a core or set of cores for the purposes of the example).

Note that we might improve performance further by having the client thread push the cache line in which the response will be returned to the server's cache. This might be done coincident with (re)initializing the response. The intuition is that the client knows that the server will need exclusive access to the cache line for the response before the server does, so we may further reduce latency by pushing it toward the server's target cache in anticipation of the response being written.

We emphasize that, at least in some embodiments, the targets specified for store instructions are merely hints for improving performance, and do not have any semantic effect. Thus, if a thread is migrated to another core or even another chip between calling localTarget( ) and waiting for a value to be returned by a store that is targeted to the value returned by localTarget( ), the only effect will be a brief reduction in performance because it will take longer for the thread to retrieve the stored value. This is important in order to avoid additional hardware and OS support to ensure that messages are not lost due to thread migration.

Similarly, if a store to a cache line has been targeted to an L1 cache, an implementation may elect to instead store the data in an L2 cache, or even in memory that is local to the receiving thread. This flexibility gives designers significant latitude, making it easier to achieve useful implementations. For example, it allows designers to provision resources for receiving targeted stores based on typical expected system behavior, not peak or worst-case behavior. It also gives the system some flexibility in how it implements the localTarget( ) function.

Together, these two observations show that we can implement proof-of-concept software mechanisms in today's systems, which will work correctly, but will not achieve the maximum performance benefit we believe is available by using enhanced hardware support that provides and uses accurate target information. These important properties allow software mechanisms and hardware support for them to be developed separately, and improved hardware support can improve performance over time.

By establishing an interface such as described above, a variety of implementation options can be used to support efficient synchronization without changing the synchronization code for a given application. Very simple implementations can be provided for existing systems, without assuming any special hardware support or optimizations. In the simplest form, localTarget( ) would simply return NULL, targeted stores would be performed using ordinary stores, and all waiting would be performed with explicit polling. While this implementation would provide little immediate benefit over simply using such code directly, it allows for more sophisticated implementations, perhaps employing new hardware functionality or optimizations, to be used in the future.

Persons skilled in the art will appreciate that a wide variety of interfaces, implementations, and hardware features or optimizations may be used consistent with the ideas discussed herein. Consider, for example, a system that associates with each L2 cache a short identifier, and supports sending a cache line to a specified cache using that identifier. In this case, the localTarget function may return the identifier of the nearest L2 cache, and a store instruction that is targeted to this L2 cache by using the identifier returned by localTarget would be sent directly to that L2 cache.

We note that mechanisms for sending a cache line to a specified cache are well established. However, to our knowledge, previous implementations of such mechanisms require the receiving cache to preallocate space in the cache to accommodate the sent cache line, evicting an existing valid line if necessary. Some embodiments of our inventions may similarly preallocate space. For example, an awaitNonNull function that waits until a specified memory location contains a non-null value, given an address, might invoke an instruction that has the effect of evicting a line (if necessary) from the set into which the cache line containing that address will be stored.

In other embodiments, it may be preferable for a cache to be prepared to accept a cache line sent to it without being explicitly prepared to do so. This may present challenges in some cases, for example because the same wires on which the data for the new cache line will be received need to be used to write back the modified data of a line to be evicted. Again, a variety of alternative approaches can be considered. First, given that targets for stores are merely performance hints, one possibility is to select an unmodified cache line to evict (so no data needs to be written back to memory) if possible, but to allow a cache to "reject" a cache line that is sent to it in case all of the lines in the relevant cache set are modified. In this case, the contents of the rejected cache line could instead be stored in a different cache (say the L3 cache below the target L2 cache) or alternatively sent to memory. Alternatively, a special staging buffer could be used to temporarily store the contents of the received cache line while space for it is allocated in the main L2 cache.

In the simple example given above, values returned by localTarget are simply identifiers of L2 caches. We note, however, that many other kinds of information might be included in these values, as they are opaque to threads. For example, these values might encode preferences such as whether to prefer using one of a limited set of resources to store an incoming cache line while allocating space for it (as described above), or to reject the cache line and send it to memory. In another example, a target value may encode a preferred method of informing a thread that is waiting for a store targeted to that value, a priority value, etc.

Persons skilled in the art will appreciate that the methods used by threads to wait for a cache line to change (or to contain a certain value) depend on what hardware features are available.

For example, a simple and generic implementation that does not depend on any specific hardware would use simple polling. A slightly more sophisticated implementation might use some system-specific mechanism for pausing between attempts to poll, for example to wait for a minimum roundtrip time, as discussed above. Implementations that are yet more sophisticated might employ hardware features such as MONITOR-MWAIT.

Some Targeted Store Implementation Approaches

The following description assumes that the reader is familiar with existing cache coherence protocols, such as MESI, MOESI, etc. We remind the reader that the O (owned) state indicates that the cache has the valid data and owns the cache line, but there may be additional copies of the cache line in S (shared) state, and furthermore, the memory may not have the valid data.

In some embodiments, a target cache receiving a message due to a targeted store is obligated to accept the associated cache line, while in others, it is acceptable for it to either silently ignore the message, or to NACK it. We discuss the two categories separately.

Implementations that Require Target Caches to Accept Pushed Lines

When a cache receives a message asking it to accept a cache line that has been stored to using a targeted-store instruction, in the general case, it may not have advance knowledge of the request, and therefore may not have allocated a way in the appropriate cache set for it. If there is a line in the set that can be silently evicted (for example, a line in Invalid state, or a line in Shared state, depending on the system into which these ideas are being integrated), then the received cache line can replace that line. If this is not the case, however, the situation is more challenging. As mentioned previously, "a special staging buffer could be used to temporarily store the contents of the received cache line while space for it is allocated in the [target] cache." Another alternative is to evict a line currently in the cache into a special buffer, while storing the received line into the way from which it was evicted. In fact, such structures are not new, and are called write-back buffers.

Other embodiments may provide the target cache with advance warning that it will receive a cache line as a result of a targeted-store instruction, thereby allowing the cache to allocate a way for the line before it arrives. Such advance warning could be provided by means of a special instruction for this purpose, which may be executed by the same thread that will perform the targeted store. Somewhat analogously to prefetching, this would be possible when a thread knows that it will soon perform a target store, but does not yet know the value to be stored. This approach can reduce latency (relative to existing systems in which all synchronization is pull-based), and may also somewhat reduce coherence traffic, but still requires more messages (and thus consumes more bandwidth) than is strictly necessary. Another possibility for such advance warning is that the receiving thread instructs the cache to allocate a way for a cache line it expects to receive. One example is a service thread scanning a number of communication variables for requests: it already knows of the possibility of receiving targeted stores to those variables.

A disadvantage of schemes that require advance notice in order to preallocate space for an expected cache line is that the cache must keep the way allocated until the expected message arrives (due to the assumption that it is obligated to take the line when it does arrive). This has several ramifications. First, if a cache receives advance notice of an expected cache line that never arrives, the preallocated way cannot be used again subsequently. This would preclude threads from speculatively informing a cache to expect a line that may not turn out to be sent. This issue could be addressed by an additional instruction to support the cancellation of such "reservations."

Another problem is that each set in the target cache can accept at most w such reservations (in a w-way cache). Possibilities for addressing this issue include: allowing reservations to be declined by the target cache in this case; burdening software with ensuring that such limits are never exceeded; and resorting to other techniques, such as those discussed above, when a cache line is received but no way is available to store it. In the latter case, the advance warnings could help to reduce the frequency of using these other techniques, but would not eliminate the additional complexity required to support them.

Another alternative is to require caches that may receive targeted stores to maintain an invariant that any cache set that may potentially receive a cache line due to a targeted store always has at least one line that is in a state (e.g., Invalid, Shared) such that it can be silently dropped when necessary. Immediately after receiving and accepting a cache line due to a targeted store, the cache may then need to restore the invariant by evicting another line before receiving another targeted store. This may present a challenge in some embodiments because, for example, the same virtual channel that would be used to evict a line may be in use for another incoming message, which might happen to target the same cache set from which a line must be evicted.

Various approaches can address this concern. For example, many systems have a separate virtual channel for programmed I/O (PIO) that has suitable forward progress properties and could be used for this purpose. In other embodiments, a victim or write-back buffer may be used to store a cache line that must be evicted in order to allocate a way in a cache set for an incoming line sent by a targeted store. A resident line can be transferred to the victim or write-back buffer so that allocating requests need not be held up while the victim is processed. In some embodiments, such a buffer is a fully associative extension of the cache. With this approach, there is no need to maintain the invariant that every cache set has a way available for an incoming targeted store, because it can be allocated on demand by evicting a line to the victim or write-back buffer. In many systems, the virtual channel on which a targeted store is received can be back-pressured if the buffer is full. Therefore, it suffices to size the buffer so that there is usually a free entry.

Maintaining the above-described invariant unnecessarily for a cache or set that will not receive a targeted store could be expensive, as it may effectively reduce the cache size in some cases. Therefore, in some embodiments, it may be desirable to maintain a state that records which caches and ways may receive targeted stores, and maintain the invariant only for those. Such a state could be driven by software (e.g., an instruction that says "maintain the invariant for the cache set associated with address x"), or alternatively may be inferred from the behavior of software. In the latter case, at least in some embodiments, the cache would at least sometimes be faced with receiving a cache line for a set in which it is not maintaining the invariant. It can then record that the invariant should be maintained going forward, but must still deal with the line it is receiving at that time. Again, other techniques described herein could be employed to handle that case, but would be used only infrequently (e.g., upon the first targeted store to a given cache set), thus allowing a wider range of reasonable implementation options. One additional possibility is to allow the receiving cache to NACK the cache line in this hopefully rare case, requiring the sending processor to retry it; because the target cache would then maintain the invariant for that cache set, the request will be accepted when the targeted store is retried.

So far, we have not addressed the questions of what state the receiving cache stores the line in and what the sending cache does with the line. Because the receiving cache is required to accept the line (or NACK it in some cases), it is not generally necessary to write the value back to memory (though it may be possible and desirable in some embodiments).

Below we discuss possible implementation approaches based on the state in which an accepted cache line is stored in the receiving cache.

Storing the Line in M or E State

If the line is stored by the receiving cache in M or E state, then the sending cache must evict the line or change its state to I (invalid). In embodiments in which the receiving cache may NACK the request, the sender must keep the data to avoid losing the stored data in case the request is NACK'd. However, the sender needs to know when it is safe to evict the line. Generally, this requires requests to be positively acknowledged, which requires additional coherence messages in the common case. In some embodiments, it may be possible for the sender to infer that it is safe to evict the line even without common-case positive acknowledgment. For example, an upper bound may be known on the time it will take to receive a NACK if one is sent, in which case the sender can evict the line after that time has elapsed without a NACK being received.

Storing the Line in O State

If the line is stored by the receiving cache in O state, then the sender can maintain the line in S state. The issues regarding when the sender can evict the line in case the receiver NACKs the request are similar to the case in which the receiver stores the line in M state.

Storing the Line in S State

If the line is stored by the receiving cache in S state, then there are several possibilities for what the sending cache does with the line. It could maintain the line in S state too, but this requires the line to also be sent to memory, because the value may be lost if both sending and receiving caches were to evict their shared copies. Alternatively, the sending cache may retain the line in O state, and in this case, it is not necessary to also send it back to memory. As discussed in detail below, this approach has several advantages, including the ability to optimize it further by weakening the memory consistency model slightly. The discussion of these issues later applies equally to cases in which the target cache is required to accept or NACK requests and cases in which it may silently ignore them.

Implementations that Allow Target Caches to Silently Ignore Pushed Lines

Given the challenges associated with approaches in the previous section, and the disadvantages and complexity of the mechanisms for addressing them, it is natural to explore implementations in which target caches can simply ignore messages resulting from targeted stores. This additional flexibility can be exploited to simplify implementations by occasionally ignoring requests to store a cache line that has been updated using a targeted store in some complicated corner cases. However, it is important for performance that the target cache does not need to ignore requests in the common cases. Many of the techniques discussed in the previous section can help to ensure that, in the common case, a cache can accept an incoming cache line, and the option of sometimes ignoring messages provides additional implementation flexibility that may simplify implementations of these techniques.

We next discuss embodiments that allow a receiving cache to simply ignore a pushed cache line. As mentioned above, in some embodiments, targeted stores are merely performance hints, and are semantically no different than ordinary stores. In others, the memory consistency model may be weakened in order to enable more efficient implementations that nonetheless provide strong enough semantics to support the kind of request-response synchronization discussed in our original document. In the latter case, in some embodiments, the weaker memory model affects only locations that are used for targeted stores. Thus, legacy code that does not use targeted stores will not be affected, and furthermore it will be possible to integrate new mechanisms that do use targeted stores into legacy code, without affecting the rest of the application.

Again, we divide our discussion of embodiments in this category by the state in which the target cache accepts an incoming cache line that has been written by a targeted store.

Storing the Line in E State

In some embodiments, the receiving cache stores the cache line in E state. To ensure that the message can be dropped by the receiver, it is necessary to also send the new value to memory, so that the value of the store is not lost in this case. In the context of a broadcast coherence protocol, the message can be marked so that memory will store the value and the receiving cache will (optionally) store it too. In a directory scheme, the value must be sent to both memory and the target cache. Typical directory protocols have a serialization point for each address (the directory). In some embodiments, the write to memory may be initiated from the directory, and subsequent requests may be ordered after the write to memory.

A potential advantage of this approach is that the cache line can subsequently be modified in the receiving cache. While this may be useful in some use cases, we note that it is not necessary in our envisaged use cases, because we use separate, one-way communication variables for requests and responses. A disadvantage, at least in directory-based contexts, is that additional messages are required in order to send the cache line to memory with each targeted store. These messages at least consume additional bandwidth, and may impact latency too.

Storing the Line in O State

In some embodiments, the receiving cache stores the cache line in O state. In this case, the issues are again essentially the same as discussed above for the M and E cases. Although it may seem unnecessary to write the data back to memory in this case, we must account for the case in which the receiving cache ignores the message (and does not even send a NACK). Although the sending cache may retain the line in S state, without further impact on the cache coherence protocol, a situation in which a copy in S state is the only copy of the data may be unacceptable because it may be silently dropped and/or may not (be able to) provide the data when it is requested.

Storing the Line in S State

In some embodiments, the receiving cache stores the cache line in S state. In this case, one option is for the sending cache to also retain the cache line in S state, and to also send the cache line to memory, as discussed above. Alternatively, the sending cache can retain the line in O state, without sending it to memory (because the O state does not require the memory to contain the current value). This alternative has several important advantages. First, additional traffic to send the cache line to memory is not needed, simplifying the protocol and avoiding unnecessary coherence traffic. Second, the receiving cache can freely ignore a request to store the sent line, as the valid data remain in O state in the sending cache. Finally, this approach lends itself to further optimization, as discussed below.

Optimizing Invalidation Messages

Embodiments in which the sending cache retains the stored-to line in O state and sends it to the target cache in S state have several advantages, as discussed above. One drawback, however, is that standard coherence protocols require copies of a line that is in S state to be invalidated before a copy of that line in O state can be upgraded to M state in order to modify it. This is necessary in order to enforce strong memory ordering requirements, as required by the memory consistency models implemented in most architectures, for example Total Store Order (TSO).

Consider a straightforward implementation in which, upon encountering a targeted-store instruction to a line held in a local cache in O state, invalidations are sent and (in directory-based protocols) acknowledgments are waited for before the line can subsequently be written. In this case, the purpose of our invention is to some extent undermined by the additional latency imposed by the need to send invalidation messages (and wait for acknowledgments in some case), and also by the additional bandwidth consumed by sending these messages.

These disadvantages can be mitigated to varying degrees in several possible ways. First, waiting for acknowledgments of invalidations need not prevent execution of all further instructions. For example, it is safe to continue to execute non-memory-access instructions, such as register and ALU instructions before such acknowledgments are received. Furthermore, known techniques for speculative execution can support the continued execution, even including memory access instructions, provided that instructions executed speculatively are not committed to architectural state before acknowledgment(s) for invalidations sent previously are received.

Furthermore, it is not necessary to wait until an instruction that stores to the line in O state is encountered before sending invalidation messages in order to invalidate the copy in S state. Sending out invalidations and changing the line from O state to M state can be done at any time. If acknowledgments are received before a subsequent targeted store to the line, the additional latency mentioned above is eliminated, and even if the acknowledgments are not yet received at that point, the latency is reduced because the invalidations have already been sent when the subsequent targeted-store instruction is encountered.

We note that, if such "proactive invalidations" are sent too soon, there is a risk that the line is invalidated in the target cache before it is even read. This is a performance issue, not a correctness one, so various heuristic approaches may be used to decide when to send out such invalidations. Persons skilled in the art will appreciate a wide variety of possible approaches, such as delaying invalidations for a fixed number of cycles, or by a programmatically controlled number of cycles, or by a number of cycles that is determined in response to feedback, such as from feedback (for example via performance counters) identifying the case in which a load to a line stored via a targeted store encounters a cache miss, suggesting that the line may have been invalidated prematurely.

Also note that some architectures permit the execution of subsequent instructions (including some memory instructions) without waiting for invalidations to propagate for a store. This is a primary feature of the TSO memory model, which is the specified memory model for SPARC™ and the de facto memory model for the Intel X86™ architectures. Other architectures (e.g., Intel Itanium™) have even weaker models. However, the expense of maintaining store buffer entries usually means that there are typically not enough entries to cover the latency of invalidation propagation. Moreover, memory models that do not maintain "write atomicity" (such as Itanium's) do not require waiting for invalidations to propagate for stores before executing subsequent instructions (except for "barrier" instructions for globally ordering stores). The techniques used to implement these memory models can be applied to "storing to O-state" for targeted stores.

Even if the above-described techniques entirely hide the latency associated with sending invalidation messages and receiving acknowledgments of them, these messages still consume coherence bandwidth, and the techniques used to hide this latency impose additional complexity on the implementation. Next, we discuss how these disadvantages can be avoided, via a slight weakening of the memory consistency model.

Optimizations Made Possible by Selectively Weakening the Memory Model

An important observation is that for many use cases of targeted-store instructions, including those described for requests and responses for operations on concurrent data structures, the ordering achieved by sending invalidations before upgrading a line in O state to M state and awaiting their acknowledgments is not actually required in the general case.

To see why, consider a simple case in which a given variable V is always used for sending requests to a given service thread via a targeted store message, and further suppose that other variables in the same cache line are not used (never stored to). In this case, no thread other than this service thread ever reads from V. Furthermore, although the service thread may be reading from multiple such variables, the order in which these reads occur is not relevant for correctness. Thus, if the service thread reads a stale cached value from V after a targeted store has already been performed to it, but before the targeted store has propagated to the service thread's local cache, it will simply appear as if the request arrived later, and the service thread will encounter the request in a subsequent load of V. Therefore, at least for this simple, static case, there is actually no need to send the invalidations at all.

In order to support this simple case, all that is needed is a way to distinguish cache lines that are in O state due to a targeted store having been performed on them, so that unnecessary invalidations can be avoided, while still performing the invalidations that are important for lines that are in O state for reasons other than being written to by a targeted store. This can be achieved by adding a new "P" cache state, which is identical to O, except that a cache line is set to P state as a result of being written by a targeted store, and that a line in P state can be silently upgraded to M state, without sending invalidations or awaiting responses thereto.

While introducing a new cache state often increases the complexity of the coherence protocol, we note that the P state is identical to the O state from the point of view of memory and all other caches; therefore, the changes to include this state are local and have no impact on the coherence protocol. Furthermore, because MOESI has only five states, the addition of another state will, in many cases, not require any additional bit to represent this state.

In some existing weak memory consistency models, cache lines can be modified when in O state, in which case the above-described optimization occurs naturally due to the underlying protocol. In such a case, barrier instructions such as "store release" are typically provided that wait for invalidations for all older stores to propagate before becoming globally visible.

Next, we discuss the advantages of this approach, before returning to address more general cases.

Advantages of Allowing Values Written to by Targeted Stores to Briefly Become Stale when Subsequently Overwritten Apart from the advantages already discussed (avoiding latency and additional coherence traffic associated with invalidations and acknowledgments thereof), there is another important advantage achieved by avoiding unnecessary invalidations. Recall that it is important that a target cache is able to accept an incoming cache line in the common case. If a previous targeted store has been accepted for the same line, and it is still cached, then this stale copy can be overwritten in the target cache. Thus, the stale copy actually serves the purpose of "reserving" a way that can be used to accept a cache line received due to a subsequent targeted store to the same line.

In some embodiments, a cache line that has been stored in a target cache in response to a targeted store can be identified as such, allowing cache eviction mechanisms to prefer to evict other lines, thereby preserving the effective "reservation" for a subsequent targeted store to the same line.

If a given cache line is used relatively frequently for communicating using targeted stores, then it may remain in cache, and as a result, the target cache would rarely need to ignore an incoming request to overwrite the line due to a subsequent target store, even if none of the other mechanisms described above for avoiding the need to do so is implemented. Thus, by allowing stale copies to briefly remain in target caches, such mechanisms may be avoided in some embodiments.

Nonetheless, we cannot ignore how this "steady state" is achieved. The first time a targeted store is performed to a given variable V, the cache line containing it may not be present in the target cache and, depending on the state of cache lines in the target cache set, the target cache may need to ignore the request in this case. In this case, subsequent requests may also need to be ignored. Furthermore, if the line is evicted for any reason, this scenario arises again.

Several possibilities exist for addressing this issue. First, we expect that it will usually be necessary to ensure that the service thread always eventually reads from each such variable. In this case, it will fetch the cache line and store it in its cache. Although the first request will not receive the full benefit of targeted stores, storing the line in its cache makes it more likely that subsequent requests can be accepted and thus the benefits will be achieved for them. In some embodiments, special load instructions may be supported that have the additional side effect of encouraging retention of the cache line, for example by recording state indicating that the line is likely to be written by a subsequent targeted store, as discussed above.

Generality

The description above addresses only the simple case in which a variable that is written using a targeted store is always used only for this purpose, and that other variables are not located in the same cache line. We note that some simplifications may in some embodiments be achieved by requiring that one or both of these restrictions is enforced by software, leaving the behavior of the system in case they are violated as implementation-specific.

Next, we discuss the more general cases, and explain how the benefits can still be achieved if one or both of these assumptions do not always hold.

First, suppose that from time to time the role of a variable changes, such that it was used exclusively for targeted stores identifying the same target ID for some time, but will now be used for a different purpose, either as a regular variable to be accessed using normal non-targeted instructions, or as a communication variable that is written using targeted stores to a different target ID. The latter may occur, for example, due to occasional reconfiguration of which operations are handled by which service threads, where the service thread is located, etc. In this case, there may be a risk that a stale value of the cache line may be seen in a case in which it does matter. In some embodiments, special memory fence instructions may be provided that allow software to prepare for such a reconfiguration by invalidating any stale values and (in some cases) waiting for the invalidations to be acknowledged before proceeding. Persons skilled in the art will appreciate that a variety of approaches are possible for exposing and implementing such instructions. Furthermore, in some contexts, instructions already exist that would fulfill the purpose, such as instructions that are guaranteed to flush any cached copies of a given line.

Suppose now that other variables in the same cache line may be used for other purposes, for example via regular (non-targeted) store instructions. As described so far, this may lead to incorrect results, because the line may be stored in P state, and an ordinary store to a location in that line may therefore be written without sending invalidations and awaiting their acknowledgments (if necessary).

In some embodiments, ordinary store instructions will send out invalidations (and await acknowledgments if necessary) when storing to a line in P state; only targeted stores would avoid these messages. Thus, if some variables in a cache line are consistently used for targeted stores identifying the same target and others are consistently used for ordinary memory operations, there is no correctness problem. If such a static relationship does not exist, mechanisms such as special memory fences would need to be used between accessing a variable using targeted stores and subsequently accessing the variable using an ordinary store, as described above. In some embodiments, a bit mask indicating which parts of the cache line have been stored using a targeted store may be maintained, allowing for error reporting in case these rules are broken.

Even though these arrangements can address the correctness issues associated with accessing some variables in a cache line using targeted stores and others using ordinary stores or targeted stores to other targets, such usage is likely to lead to performance issues such as false sharing; therefore, it may not be worthwhile to complicate an implementation in order to allow it. Some embodiments may assume that software will not mix variables in the same cache line in this way. Some embodiments may report an error in case an ordinary store is performed to a line stored in P state. Some embodiments may further record the target ID specified by the previous targeted store to the same line, thus enabling an error to be reported if a targeted store identifying a different target ID is executed.

As discussed previously, it may be desirable to allow several stores to be performed to a cache line, the last of which has the effect of sending the cache line to the target cache. In this case, some embodiments may include variants of stores that indicate that they are "preparing" a cache line for a subsequent targeted store, thus indicating that an error should not be generated due to these stores. In this case, an error may be subsequently generated in some embodiments, for example if there is no subsequent targeted store performed to the line before another event, such as a store to a different cache line, occurs.

We next describe details of an exemplary system that provides targeted stores.

System

FIG. 1 illustrates an exemplary shared-memory multiprocessor system 100 in accordance with the disclosed embodiments. Shared-memory multiprocessor system 100 includes a number of processor cores 101-108 that execute instructions and perform associated operations on data located in level one (L1) caches 111-118. These L1 caches 111-118 comprise a portion of a memory hierarchy, which includes L2 caches 121 and 123, as well as L3 cache 125. In the embodiment illustrated in FIG. 1, processor cores 101-104 are coupled to L1 caches 111-114, which are coupled to L2 cache 121, and all of these cores and caches are located on semiconductor chip 141. Similarly, processor cores 105-108 are coupled to L1 caches 115-118, which are coupled to L2 cache 123, and all of these cores and caches are located on semiconductor chip 142. Finally, L2 caches 121 and 123 are coupled to L3 cache 125, and L3 cache 125 is coupled with main memory 126 (not shown). In some embodiments there may be more or fewer levels of on-chip cache. Also, there may also be multiple off-chip L3 caches or no off-chip L3 cache. Moreover, other embodiments may include multiple memories instead of a single main memory.

Note that each of L1 caches 111-118 can be implemented using a combined instruction and data cache. Alternatively, each of L1 caches 111-118 can be implemented using a separate L1 instruction cache and a separate L1 data cache.

Moreover, all of the illustrated caches (including L1 caches 111-118, L2 caches 121 and 123, and L3 cache 125) collectively form a cache-coherent memory system which operates in accordance with a specific cache-coherence policy, such as the MOESI cache-coherence policy.

Also note that semiconductor chip 141 maintains state information 122, which includes thread-specific state information that can be used to determine which processor cores and associated caches are accessed by a specific thread. Similarly, semiconductor chip 142 maintains state information 124, which can be used to determine which processor cores and associated caches are accessed by a specific thread that executes within semiconductor chip 142. Note that this state information 122 and 124 can be used to determine where a specific thread is located as is described below with reference to FIGS. 4 and 5.

As illustrated in FIG. 1, system software 131 controls the execution of a number of threads 133-135 on processor cores 101-108. For example, system software 131 can allocate thread 133 to execute on processor core 102, while thread 134 executes on processor core 104 and thread 135 executes on processor core 108. Note that system software 131 can include lower-level system software, such as a hypervisor, and can also include higher-level system software, such as an operating system. System software 131 also contains state information 132, wherein state information 132 includes thread-specific state information which can be used to determine which processor cores and associated caches are accessed by a specific thread.

Interface

Figure 2:
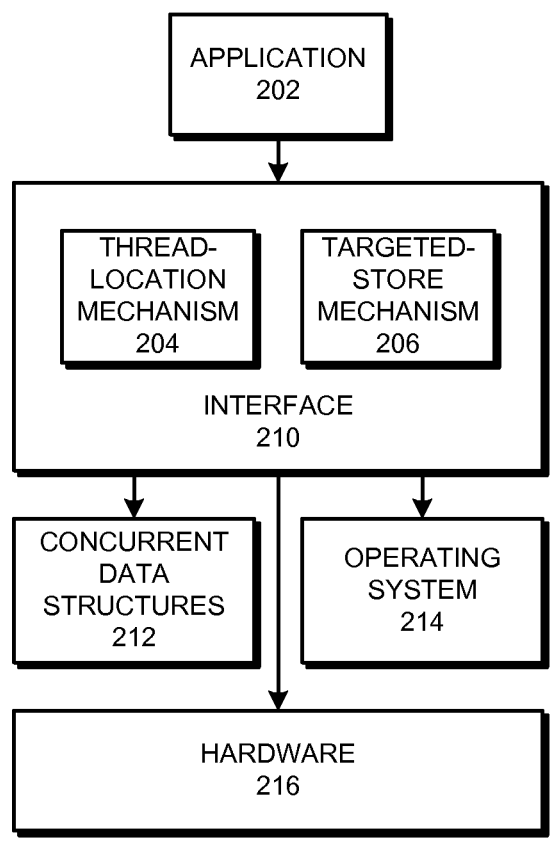
FIG. 2 illustrates an interface that supports targeted stores in accordance with the disclosed embodiments.

FIG. 2 illustrates an interface 210 that supports targeted stores in accordance with the disclosed embodiments. As illustrated in FIG. 2, an application 202 can access interface 210, wherein interface 210 provides access to a number of mechanisms, including a thread-location mechanism 204 and a targeted-store mechanism 206. Interface 210 can include an application programming interface (API) which provides functions or methods to perform the thread-location and targeted-store operations. In this case, the thread-location mechanism 204 is implemented using a thread-location function (e.g., localTarget( )), and targeted-store mechanism 206 is implemented using a targeted-store function. These functions can interact with the computer system in a number of different ways. For example, the functions can access data structures 212 which can be used to store thread-location information. They can also make system calls to operating system 214. The functions can also execute instructions that are defined in an instruction-set architecture which execute on and/or access hardware 216.

Interface 210 can alternatively be a system call interface which is exposed by the operating system to provide system calls to perform the thread-location and targeted-store operations. In this case, thread-location mechanism 204 and targeted-store mechanism 206 are implemented as system calls. These system calls can access concurrent data structures 212, make further system calls to operating system 214, or can execute instructions to execute on and/or access hardware 216.

Interface 210 can also be implemented using hardware that executes instructions defined within an instruction-set architecture. In this case, the thread-location mechanism 204 may be implemented through a special-purpose thread-location instruction, and the targeted-store mechanism may be implemented through a special-purpose targeted-store instruction.

Figure 3:
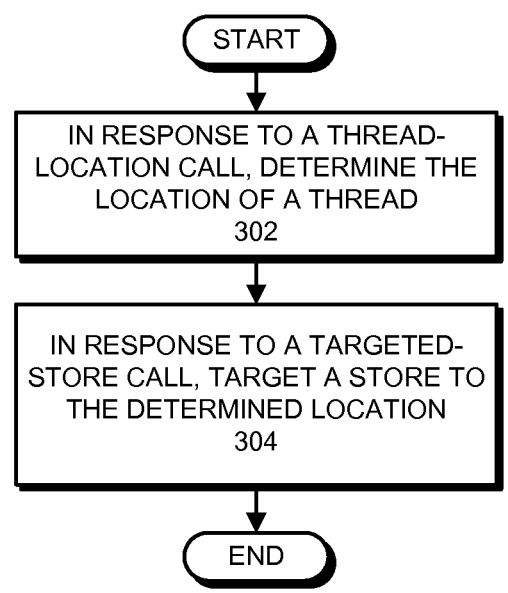
FIG. 3 presents a flow chart illustrating the process of responding through the interface to calls that support targeted stores.

FIG. 3 presents a flow chart illustrating the process of responding through the interface 210 to calls that support targeted stores. First, in response to a thread-location call, the system determines the location of the thread making the call (step 302). Next, in response to a targeted-store call, the system performs a targeted store to the determined location (step 304). Note that the thread-location call and the targeted-store call can comprise calls to functions or methods if interface 210 is an API. They can also comprise system calls if interface 210 is a system-call interface for an operating system. Finally, if interface 210 implements an instruction-set architecture, the thread-location call and/or the targeted-store call can comprise executions of instructions defined within the instruction-set architecture.

Thread-Location Instruction

Figure 4:
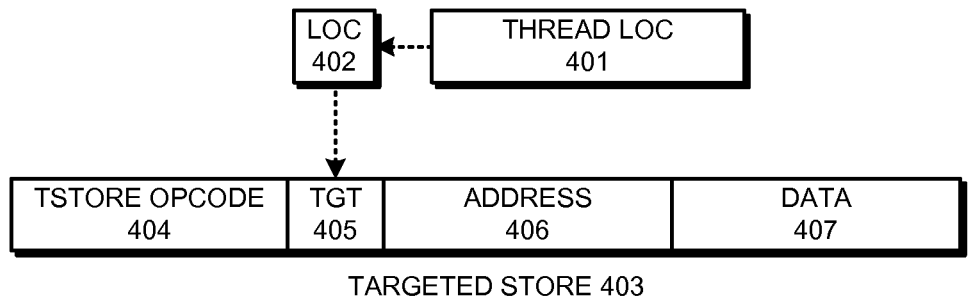
FIG. 4 illustrates how a thread-location instruction is used in conjunction with a targeted-store instruction in accordance with the disclosed embodiments.

FIG. 4 illustrates how a thread-location instruction 401 (e.g., localTarget( )) is used with a targeted-store instruction 403 in accordance with the disclosed embodiments. As is illustrated in FIG. 4, thread-location instruction 401 may have no input parameters and returns a location identifier 402, which can be used to identify a cache that the thread is likely to be accessing within multiprocessor system 100. In contrast, targeted-store instruction 403 has a number of fields, including an opcode field 404, which contains a bit pattern indicating that the instruction is a targeted-store instruction. It also includes a target field 405 which stores an identifier for a specific cache to which the targeted store is directed. Like any normal store instruction, targeted-store instruction 403 also includes an address field 406, which specifies an address to which the store is directed (or alternatively specifies a register that contains the address), and a data field 407, which contains data to be written to the address.

During system operation, when a thread executes thread-location instruction 401, thread-location instruction 401 returns a location 402 which can be used to identify a cache that the thread is likely to be accessing within the multiprocessor system. Next, location 402 can be inserted into the target field 405 of targeted-store instruction 403, which performs a targeted store directed to the specified target cache.

Figure 5:
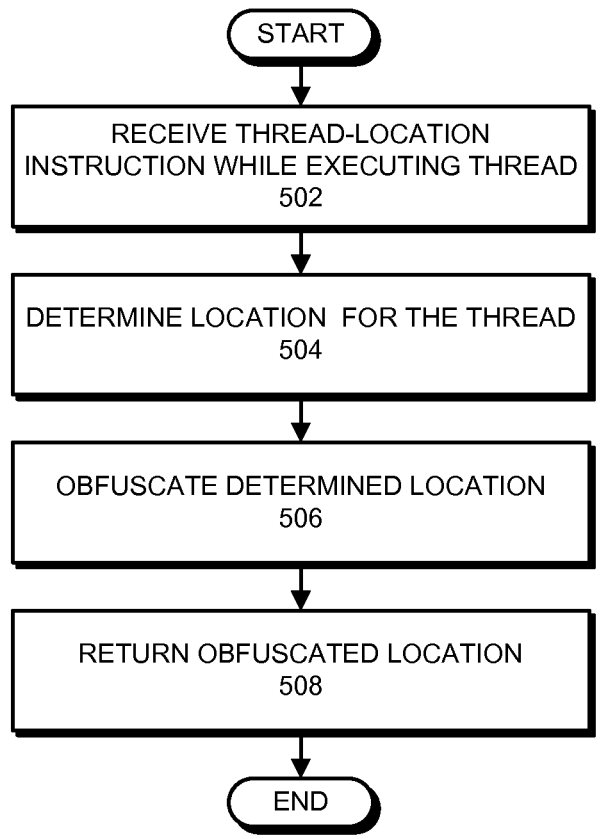
FIG. 5 presents a flow chart illustrating how the system executes a thread-location instruction in accordance with the disclosed embodiments.

FIG. 5 presents a flow chart illustrating how the system executes a thread-location instruction 401 in accordance with the disclosed embodiments. The process starts when a processor core that is executing a thread receives the thread-location instruction 401 (step 502). Then, in response to receiving thread-location instruction 401, the system determines a location 402 for the thread (step 504). Note that this location 402 can, for example, be an L1 or L2 cache which the thread is likely to access.

This location 402 can be determined in a number of ways. In some embodiments, the thread-location instruction 401 makes a system call to system software 131, and system software 131 examines thread-specific state information 132 to identify a processor core that the thread is executing on. By identifying a specific processor core, the system implicitly identifies a specific L1 or L2 cache that the processor core is likely to access. However, a system call typically takes a long time to execute. Hence, to improve performance, in other embodiments the thread-location instruction 401 directly accesses state information 122 contained in semiconductor chip 141 that the thread is executing on, and state information 122 is used to determine which cache the thread is likely to access.

Next, after the thread's location is determined, the location may be obfuscated or otherwise encoded or encrypted (step 506). Then, the obfuscated location is returned by the instruction (step 508). Note that obfuscating the location of the thread makes it hard for malicious software to use the thread-location instruction to compromise security in the multiprocessor system. Also, note that if the location is obfuscated, any subsequent instruction that uses the obfuscated location information needs to be able to decrypt or decode the location information.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A system comprising:
a shared-memory multiprocessor including a plurality of processors and a memory; and
an interface that provides access to,
a thread-location function or instruction that, when executed by a thread:
uses an identifier that identifies the thread to retrieve a location identifier that identifies a cache memory where the thread has accessed data; and
returns the location identifier to the thread; and
a targeted-store function or instruction that receives the location identifier and, when executed by the thread, uses the location identifier to push data for the targeted-store function or instruction to the cache memory.

2. The system of claim 1, wherein the location identifier identifies a set of cache memories in the shared-memory multiprocessor.

3. The system of claim 1, wherein the interface facilitates executing instructions that comprise an instruction-set architecture for the shared-memory multiprocessor.

4. The system of claim 1, wherein the interface implements a system call interface for an operating system in the shared-memory multiprocessor.

5. The system of claim 1, wherein the interface comprises an application programming interface (API) including functions or methods that provide access to the targeted-store function or instruction and the thread-location function or instruction.

6. The system of claim 1, wherein the targeted-store function or instruction either directly implements or indirectly calls a special-purpose targeted-store instruction in an instruction-set architecture for the shared-memory multiprocessor.

7. The system of claim 1, wherein the thread-location function or instruction retrieves thread-state information maintained by software for the system, wherein the thread-state information indicates a location where the thread is executing within the system.

8. The system of claim 7, wherein the software for the system comprises at least one of:
a hypervisor for the system; and
an operating system for the system.

9. The system of claim 1, wherein the thread-location function or instruction retrieves thread-location information from system hardware.

10. The system of claim 1, wherein the targeted-store function or instruction and the thread-location function or instruction access one or more data structures in the shared-memory multiprocessor.

11. A method for supporting targeted stores in a shared-memory multiprocessor, comprising:
receiving, at the shared-memory multiprocessor, executable code that comprises a thread-location call and a targeted-store call; and
executing at least some of the executable code using a processor of the shared-memory multiprocessor by:
accessing data for a thread using a cache memory for the processor;
in response to the thread performing the thread-location call:
using an identifier that identifies the thread to retrieve a location identifier that identifies the cache memory; and
returning the location identifier to the thread; and
in response to the thread performing the targeted-store call, targeting a store to the cache memory by using the location identifier to push data for the targeted-store call to the cache memory.

12. The method of claim 11, wherein the location identifier identifies a set of cache memories in the shared-memory multiprocessor.

13. The method of claim 11, wherein the thread-location call and the targeted-store call comprise system calls to an operating system in the shared-memory multiprocessor.

14. The method of claim 11, wherein the thread-location call and the targeted-store call comprise calls to an application programming interface (API) including functions or methods that perform operations for the targeted-store operation and operations for the thread-location operation.

15. The method of claim 11, wherein targeting the store involves either directly executing or indirectly calling a special-purpose targeted-store instruction in an instruction-set architecture for the shared-memory multiprocessor.

16. The method of claim 11, wherein retrieving the location identifier involves retrieving thread-state information maintained by software for the multiprocessor, wherein the thread-state information indicates a location where the thread is executing.

17. The method of claim 11, wherein retrieving the location identifier involves retrieving thread-location information from system hardware.

18. The method of claim 11, wherein retrieving the location identifier and targeting the store involve accessing one or more data structures for the shared-memory multiprocessor.

19. A non-transitory computer-readable storage medium comprising instructions that, when executed by a processor, cause the processor to perform a method for supporting targeted stores, the method comprising:
accessing data for a thread using a cache memory for the processor;
in response to the processor executing a thread-location call for the thread:
using an identifier that identifies the thread to retrieve a location identifier that identifies the cache memory; and
returning the location identifier to the thread; and
in response to the processor executing a targeted-store call for the thread, targeting a store to the cache memory by using the location identifier to push data for the targeted-store call to the cache memory.

20. The system of claim 19, wherein the location identifier identifies a set of cache memories for the processor.

* * * * *